United States Patent [19]

Albritton et al.

[11] Patent Number: 4,999,037
[45] Date of Patent: Mar. 12, 1991

[54] LOUVER ASSEMBLY

[75] Inventors: Charles W. Albritton, Hermitage; Charles D. Reagle, Mercer, both of Pa.

[73] Assignee: FL Industries Inc., Livingston, N.J.

[21] Appl. No.: 477,292

[22] Filed: Feb. 8, 1990

[51] Int. Cl.[5] .............................................. B01D 45/08
[52] U.S. Cl. ...................................... 55/385.1; 55/440; 55/443; 55/467
[58] Field of Search ...................... 55/385.1, 439, 440, 55/442, 443, 467; 98/121.1

[56] References Cited

U.S. PATENT DOCUMENTS

| 2,125,271 | 8/1938 | Dahlman | 55/440 |
| 3,837,269 | 9/1974 | Sweet et al. | 55/440 X |
| 3,961,922 | 6/1976 | Leung | 55/440 |
| 4,874,412 | 10/1989 | Nowack | 55/443 X |

FOREIGN PATENT DOCUMENTS 551685  5/1932  Fed. Rep. of Germany ........ 55/440

Primary Examiner—Harold Joyce
Attorney, Agent, or Firm—Carella, Byrne, Bain, Gilfillan, Cecchi & Stewart

[57] ABSTRACT

A louver assembly, which acts as a water-removing inertial separator, is located in the air intake of an enclosure maintained at negative pressure. The louver includes a number of spaced vanes, each formed without discontinuities by simple bending into a stair-step-like configuration when viewed end-on. Air enters the enclosure by passing between adjacent vanes, experiencing changes of direction of between 70 degrees and 90 degrees at the vane's surfaces to separate water therefrom.

9 Claims, 1 Drawing Sheet

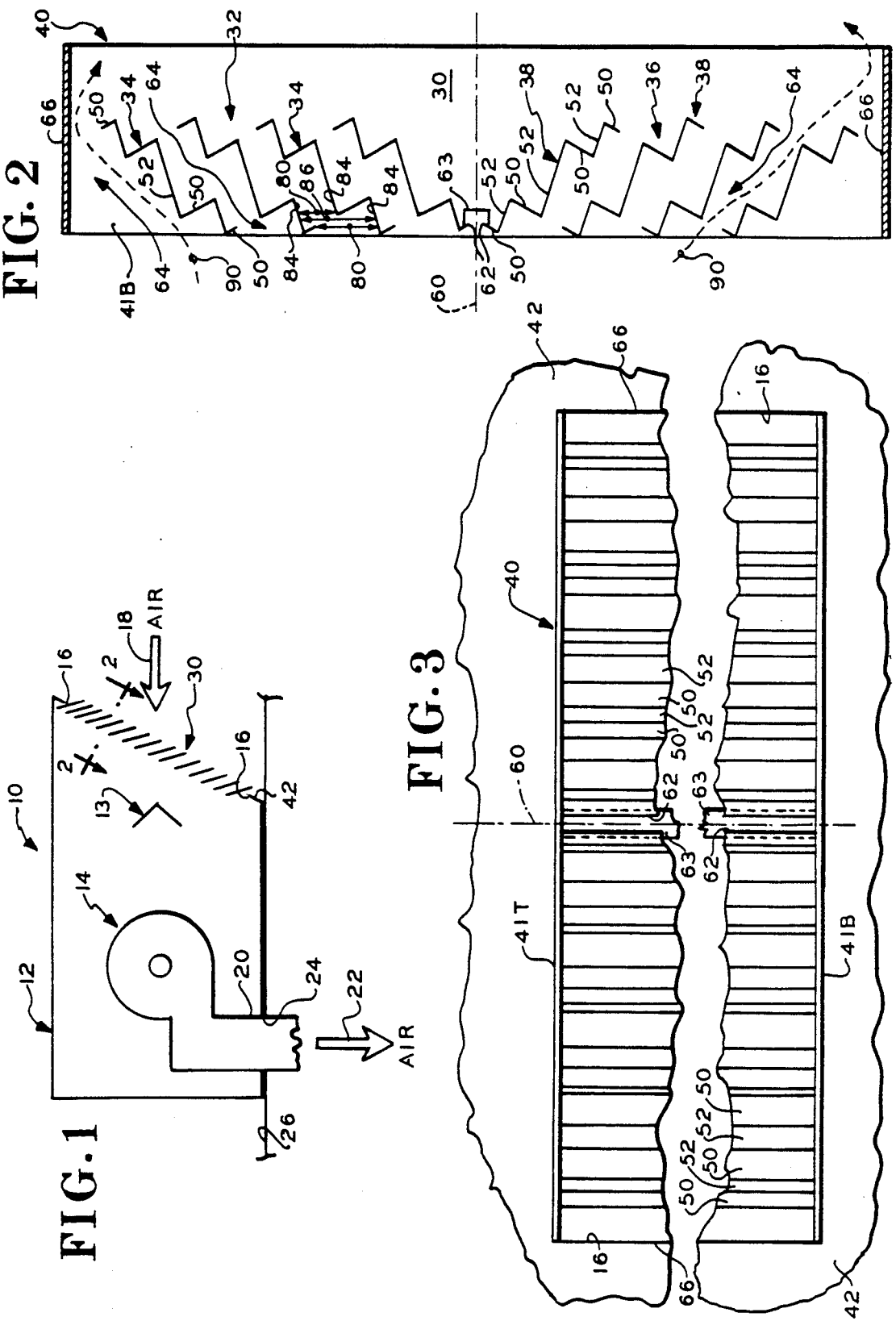

LOUVER ASSEMBLY

BACKGROUND OF THE INVENTION

1. Field of the Invention

The present invention relates to a louver assembly, and, more particularly to an improved louver assembly for an enclosure which houses HVAC equipment.

2. Description of the Prior Art

HVAC equipment may be contained in an enclosure to protect the equipment from the environment and to prevent personnel from contacting rotating, heated or other hazardous parts. When heating facilities are within the enclosure, the intake of a blower or fan applies a negative pressure to the volume or space surrounded by the enclosure to draw air into the enclosure. After a burner heats the air which is drawn in, the blower expels the air into an area to be heated through an outlet formed in the enclosure. Thus, the enclosure serves protective functions and acts as a vital part of the air transmission path.

It is disadvantageous to draw air which contains moisture or water into the enclosure, whether such moisture is in the form of rain, fog, mist or water vapor. First, the specific heat of air which contains water is higher than that of dry air. Accordingly, more energy is required, and ultimately more fuel at greater expense, to heat moist air. Second, water-laden air can damage the HVAC equipment. Over a period of time, moisture drawn into the enclosure can cause corrosion or other damage to metal and other parts of the equipment. Moreover, a sudden inflow of a large quantity of water, in the form of wind-driven rain, for example, can short-circuit electrical devices, extinguish the burner and cause belts to lose traction on their pulleys.

Devices for removing water as well as particulate matter entrained in air are known. Such devices, termed inertial separators, are well known for use in the air intakes of large turbine engines, such as those present on ships and in air craft. Inertial separators are shown in the following U.S. Pat. Nos. 4,312,645 to Mavros et al; 4,698,078 to Mavros; 3,498,205 to Kautz et al; and 3,348,466 to Lane et al. Filters used in the same environments to remove particulates are known, see U.S. Pat. No. 3,411,272 to Carmon, but filters are generally ineffective for removing water from an air stream. Rainproof louvers for enclosures are also known. See the following U.S. Pat. Nos. 4,452,024 to Sterriker et al; 4,310,993 to White; 4,064,670 to Lichtenwald; and 1,972,991 to Hinkle.

Inertial separators of the type used on ships and air craft comprise a plurality of closely spaced chevrons or V-shaped vanes held in a frame. Air flows at very high velocity through the separator. As it so flows, the air must turn or bend several times to follow the tortuous path between the vanes. Entrained particles, such as salt, sand or other particulate matter contained in air, generally have a higher mass and density than the "particles" of air in which the are entrained. As a consequence, as the entrained particles bend and turn, they are thrown outwardly against the surfaces of the vanes due to centrifugal forces thereon. Stated differently, the less massive air "particles" are capable of negotiating the bends and turns, while the particles of the more massive and more dense particulate matter are not, and these impact against the vanes. The vanes in inertial separators typically contain stops, ducts or projections which ensure that the impacted matter is not re-entrained in the high velocity air flowing therepast and conduct the impacted matter downwardly (due to gravity) to a collection area.

Inertial separators for turbine intakes are expensive to fabricate. The shapes of the vanes thereof are rather complex, and forming them is one factor contributing to the high cost. Further, the projections on the vanes represent discontinuities, adding to the complexity of the formation thereof. It is difficult, if not impossible, to form the vanes of naval and aero inertial separators by simple bending techniques.

Naval and aero inertial separators must be very efficient to protect the massive, powerful turbines and other engines thereof. This need for efficiency results in the vanes being spaced closely together. Although the close spacing increases fictional resistance to air flow, such is easily overcome by the high negative-pressure-creating power of ship-board or plane-board turbines. The close spacing, of course, contributes to the high efficiencies of the separators.

Typical rainproof louvers heretofore used contain vanes or blades which are complexly shaped and are often formed of multiple, attached pieces. Where not formed of attached pieces, the vanes or blades, in cross-section, have sinuous, multi-run configuration with varying angles between the respective runs thereof, and often include projections or protrusions which are extruded, if they do not constitute separate attached pieces.

SUMMARY OF THE INVENTION

A primary object of the present invention is the provision of an improved louver assembly for an enclosure, such as that housing HVAC equipment, which is reasonably priced and sufficiently efficient to remove from air flowing thereinto water which might otherwise enter the enclosure.

A further object of the present invention is the provision of a louver assembly as set forth above which removes water from air drawn into an enclosure to which a negative pressure is applied by a fan or blower of moderate strength, without hindering air flow into the enclosure.

Yet another object of the present invention is the provision of a louver assembly as hereinbefore described which is simple and inexpensive to fabricate.

With the above and other objects in view, the present invention contemplates a louver assembly for the air intake of an enclosure, the interior of which is maintained at a negative pressure by a fan or blower of moderate strength within the enclosure. The fan, and the negative pressure it creates, draws air through the louver assembly at moderate velocities.

The louver assembly includes a first plurality of spaced apart vanes. Each vane is formed by the simple bending of an initially planar member and is free of any projections or other radical discontinuities, the formation of which would necessitate attaching separate pieces, extruding or complex retroflex bending.

As viewed end-on, each vane in the first plurality has a number of first, planar, mutually parallel segments. Interconnecting the first segments are a plurality of second, mutually parallel segments. The angle between the second segments and the first segments is acute. The interconnected segments assume a stair-step-like cross-section, with the angle between adjacent first and second segments preferably being between approximately 70° and 80°.

The louver assembly also includes a second plurality of spaced apart vanes. The vanes in the second plurality are formed and configured in the same way as are the vanes in the first plurality.

Facilities mount the vanes in the air intake so that as viewed end-on the vanes extend generally in the direction of air flow and away from the location whereat the air initially enters the assembly. Both pluralities of vanes are mounted so that the first segments of the vanes therein are mutually parallel and the second segments of the vanes therein are, in turn, mutually parallel. As mounted, the first and second pluralities have a mirror image relationship to each other relative to, and on either side of, an axis of the assembly. The free edges of the first segments of the vanes in each plurality closest to the axis either are closely spaced, with the opening therebetween blocked by a cap. The passageways or spacings between and along adjacent vanes are generally directed away from both the axis and the location of initial air entry into the assembly.

The foregoing louver assembly operates as an efficient inertial separator for the enclosure and has a minimum of dead air areas. It is simple and inexpensive to fabricate and does not offer appreciable resistance to air caused to flow into the enclosure by a typical HVAC blower of moderate power.

In preferred embodiments, the assembly includes mounting facilities or a frame having walls against which air impinges after passing through the passageways spacings. This impingement removes further entrained material. Also, it is preferred that the frame orient the vanes obliquely to the direction of air flow into the assembly. This orientation shields the assembly from direct impingement thereon of non-wind-driven falling rain and other precipitation.

In further preferred embodiments, the passageways or spacings of one plurality of vanes diverge relative to the passageways or spacings of the other plurality. This diverging occurs on either side of the axis. In this way a substantial amount of the air passing through each plurality impinges on one of the walls.

In additional preferred embodiments, each vane has four first segments and two second segments. The spacing between adjacent first segments in each plurality at the location where air enters the assembly ranges between 1-1½ inch. The width of the passageways between adjacent vanes in each plurality ranges between 1 to 1½ and 2 to 3 inches. More generally, the number of segments, the number of vanes and the width of the passageways between the vanes are all selected so that the louver assembly functions as an effective moisture separator for air passing through the assembly. Further, the vane spacing is selected so as to minimize undue resistance to air flow through the louver assembly.

BRIEF DESCRIPTION OF THE DRAWINGS

FIG. 1 is a side elevational, partially sectioned, diagrammatic view of an HVAC enclosure which includes a louver assembly according to the principles of the present invention;

FIG. 2 is a sectional view of the louver assembly of the present invention taken along line 2—2 of FIG. 1; and FIG. 3 is a partial and broken front elevation of the louver assembly of the present invention taken from the right side of FIG. 1.

DETAILED DESCRIPTION OF THE INVENTION

Referring first to FIG. 1, there is shown a stylized depiction of HVAC equipment 10 within an enclosure 12. The HVAC equipment 10 may be utilized to heat the interior of a building (not shown), in which event the equipment 10 includes a burner (13) and a fan or blower 14. When the blower 14 operates it draws air into the enclosure 12 through an intake 16, as shown by the arrow 18, following which the air is heated by the burner and is forced by the blower 14 through a duct 20 into the interior of the building, as shown by the arrow 22. The duct 20 may pass into the building through an opening 24 formed through the roof 26 thereof. Other arrangements, such as those utilizing a burner and heat exchanger to heat the air are clearly contemplated.

Typically mounted in the intake 16 is a grill or louver, generally denoted 30. The function of the louver 30 is to prevent personnel, birds and small animals from intruding into the interior of the enclosure 12. The louver may also, as with the present invention, obviate the entry of moisture and other massive, dense particulate material which is entrained in the air from entering the enclosure to the detriment of the HVAC equipment. Prior art louvers 30 suffer from the shortcomings discussed earlier.

Referring now to FIG. 2, a louver assembly 30 according to the present invention comprises a first plurality 32 of spaced apart vanes 34 and a second plurality 36 of spaced apart vanes 38. The vanes 34 and 38 are preferably generally vertically oriented in FIGS. 1 and 3, and extend generally from near the top to near the bottom of the intake 16. As discussed in more detail below, the vanes 34 and 38 are preferably fabricated from formed sheet metal. The vanes 34 and 38 are rigidly and stationarily held in the intake 16 in a frame 40 which mounts the tops and bottoms of the vanes 34 and 38 between a top member 41T and a bottom member 41B of the frame 40 in any conventional manner. The frame 40 is, as shown in FIG. 3, held in the intake 16 by attachment to a sidewall 42 of the enclosure 12 in any conventional fashion.

As seen in FIG. 2, the vanes 34 and 38 are formed by simple bending with no projections or protrusions such as might be effected by attaching additional material, by extrusion or by complex retroflex bending. Preferably the bending produces acute angle bends of about 70° to 80°, although other angles are contemplated, as should be obvious.

Each vane 34 and 38 has a plurality of first segments 50. The segments 50 are planar; the segments 50 of each vane 34 and 38 are parallel to each other. Each vane 34 and 38 also includes a plurality of second segments 52. The segments 52 are normal to the segments 50 and serve to interconnect serial segments 50 within each vane 34 and 38. The segments 52 are mutually parallel within each vane 34 and 38. As clearly shown, in cross-section or end-on, the vanes 34 and 38 have a simple stair-step-like configuration.

The frame 40 mounts the vanes 34 and 38 so that they extend generally toward or into the interior of the enclosure 12, that is, in the direction of air flow 18 and away from the point of entry of the air into the intake 16. Further, as shown, the frame 40 holds the first and second pluralities 32 and 36 so that they have a mirror image spatial relationship relative to an axis of symmetry 60 of the assembly 30. Free edges 62 of the segments 50 of the vanes 34 and 38 closest to the axis 60 are preferably closely spaced with the space therebetween being closed by a cap 63 located behind the segments 50. If desired the free edges 62 may be made continuous by simple engagement, by joining the edges 62 in any known manner, such as by welding or brazing, or by fabricating the two vanes 34 and 38 integrally from a single piece of sheet metal.

Passageways or spacings 64 between adjacent vanes 34 and 38 permit air to pass therethrough. These passageways are directed somewhat angularly away from both the axis 60 and the location of entry of air into the assembly 30.

The frame 40 includes generally upstanding side walls 66 which cooperate with the first adjacent vane 34 and 38 to define left-most and right-most points of entry for air.

Preferably, as shown in FIG. 1, the assembly 30 is tilted so that the bottom thereof is moved toward the interior of the enclosure 12 relative to the top of the enclosure 12. Conveniently this may be achieved by angling the side wall 42. This orientation of the assembly 30 provides some shielding of the intake 16 from falling rain and other precipitation.

The vanes 34 and 38 may have three segments 50 interconnected by two segments 52, although this number may be adjusted to suit the particular environment in which the assembly 30 is used in a manner which ensures that the assembly functions efficiently as a moisture separator. Moreover, as shown, the lengths of the segments 50 and 52 may vary, with the central segment 52 being elongated to accommodate attachment thereto of facilities, such as thin rods or spokes, which mount the vanes 34 and 38 to the members 41T and 41B.

It has been found that the assembly 30 functions well as a moisture separator if the distance 80 between the free edge 82 of a forward segment 50 and the surface 84 of the adjacent segment 52 is between 1 to 1½ inch. The same distance 80 obtains between the surfaces 84 of adjacent but offset segments 52. Similarly, it is preferred if the distance 86 between the surfaces 84 of adjacent and overlying segments 52 is between 2 to 3 inches.

In operation, the blower 14 draws air through the intake 16 and into the enclosure 12. In so moving, the air flows through the louver assembly 30 via the passageways 64 defined between the vanes 34 and 38. the stair-step configuration of the passageways 64 defined by the vanes 34 and 38 causes the entering air to follow a plurality of tortuous paths which, as previously explained, results in moisture and other entrained particulates being centrifugally removed and impinging on the surfaces of the vanes 34 and 38. The impinging material runs down the vanes where it is collected or directed to a drain or the like by drain facilities (not shown) of any known construction. As shown by the arrows 90, the air following the outermost passageways 64 impinges on the side walls 66 of the frame 40. This impingement is effective to separate moisture and other entrained particulates from the air, in addition to that separated by the action of the outermost vanes 34 and 38. Moreover, and to the same end, air passing through the inner passageways 64 is also directed at the walls 66 by the angular orientation of the passageways 64 as shown in FIG. 2.

As shown in FIG. 3, from head-on the assembly 30 has a neat, uncluttered appearance. No sight lines into the interior of the enclosure 12 are available.

It has been found that as the angle between the segments 50 and 52 approaches 90°, increasing amounts of separated material become re-entrained in the air stream. Contrariwise, with the angle at between about 70°–80°, and particularly at about 75°, separated material runs down the bend between the segments 50 and 52 rather then re-entering the air stream.

Although certain specific embodiments of the present invention are described in the foregoing detailed description, it should be understood that this invention is not limited to such specific embodiments, and is capable of modification and rearrangement.

We claim:

1. A louver assembly for the air intake of an enclosure, the interior of which is maintained at a negative pressure by a fan therewithin so that air is drawn through the louver assembly; the louver assembly comprising:

a first plurality of spaced vanes defining passageways therebetween, each vane being free of discontinuities and being formed by simple bending of a planar member and including a plurality of first mutually parallel, planar segments, and a plurality of second, mutually parallel, planar segments which include with the first segments an angle, of between about 70° to about 90° each second segment respectively interconnecting two serial first segments so that the vanes assume a stair-step-like cross-section;

a second plurality of spaced vanes formed and configured as the first plurality of vanes; and means for mounting the vanes in the air intake so that, when the vanes are viewed end-on (a) the vanes extend in the direction of air flow and away from the location of air entry into the assembly;

(b) the first plurality of vanes has a mirror image relationship with the second plurality of vanes relative to an axis of symmetry of the assembly;

(c) the free edges of the first planar segments of the vanes in the first and second pluralities of vanes closest to the axis are closely spaced; and (d) the passageways between adjacent vanes are generally directed away from both the axis and the location of air entry into the assembly.

2. A louver assembly as set forth in claim 1, where:
   the mounting means includes walls against which air impinges moving through the passageways.

3. A louver assembly as set forth in claim 1, wherein:
   the mounting means tilts the first and second plurality to angle the planes of the segments away from the vertical.

4. A louver assembly as set forth in claim 3, wherein:
   the mounting means includes walls against which air impinges as it moves through the passageways.

5. A louver assembly as set forth in claim 2, wherein:
   when the vanes are viewed end-on, the passageways between the vanes of the first and second pluralities, respectively, diverge on either side of the axis in the direction of air flow, and the walls are spaced apart on either side of the axis so that each receives air passing through the passageways between the vanes of a respective one of the pluralities.

6. A louver assembly as set forth in claim 1, wherein:
   when the vanes are viewed end-on, each vane has three first segments and two second segments, and each passageway, at the location of air entry into the assembly between adjacent first segments in a respective plurality, has a width of approximately 1 inch to 1½ inch.

7. A louver assembly as in claim 6, wherein: and the adjacent vane form a passageway therebetween.

8. A louver assembly as set forth in claim 7, wherein: the width of the passageways between adjacent vanes varies between 1 to 1½ inch and 2 to 3 inches.

9. A louver assembly as set forth in claim 1, wherein: the angle included between adjacent segments is from about 70° to about 80° so that the assembly is effective to function as an inertial moisture separator for air passing through the assembly:

* * * * *